US012767491B2

(12) United States Patent
Lin

(10) Patent No.: US 12,767,491 B2
(45) Date of Patent: Oct. 20, 2026

(54) CUSHIONING MECHANISM FOR CLAW MACHINE

(71) Applicant: FA TENG TECHNOLOGY CO., LTD., Taichung City (TW)

(72) Inventor: Shau-Yu Lin, Taichung City (TW)

(73) Assignee: FA TENG TECHNOLOGY CO., LTD., Taichung City (TW)

( * ) Notice: Subject to any disclaimer, the term of this patent is extended or adjusted under 35 U.S.C. 154(b) by 140 days.

(21) Appl. No.: 18/954,465

(22) Filed: Nov. 20, 2024

(65) Prior Publication Data

US 2026/0103363 A1 Apr. 16, 2026

(30) Foreign Application Priority Data

Oct. 11, 2024 (TW) ................................ 113138592

(51) Int. Cl.
*B66C 13/04* (2006.01)

(52) U.S. Cl.
CPC .................................... *B66C 13/04* (2013.01)

(58) Field of Classification Search
CPC ......... B66C 13/04; G07F 17/3297; A63F 9/30
USPC .......................................................... 273/447
See application file for complete search history.

(56) References Cited

U.S. PATENT DOCUMENTS

| | | | | |
|---|---|---|---|---|
| 5,368,310 A * | 11/1994 | Ogata | G07F 17/3297 | 273/448 |
| 7,080,840 B1 * | 7/2006 | Chen | A63F 9/30 | 273/447 |
| 7,635,131 B2 * | 12/2009 | Fukazawa | A63F 9/24 | 273/447 |
| 7,857,318 B1 * | 12/2010 | Shoemaker, Jr | G07F 17/3297 | 273/447 |
| 8,079,596 B1 * | 12/2011 | Shoemaker, Jr. | G07F 17/3297 | 273/447 |
| 2020/0094130 A1 * | 3/2020 | Nobata | A61B 5/162 | |

* cited by examiner

*Primary Examiner* — Jacob K Ackun
(74) *Attorney, Agent, or Firm* — Che-Yang Chen

(57) ABSTRACT

A cushioning mechanism for a claw machine includes a rotating plate and a return member. The rotating plate has a pivot end and a movable end. The pivot end is pivotally connected to a base of a winding device of the claw machine in a manner that the movable end is movable relative to the pivot end. A first pulley of the winding device is disposed on the movable end. The return member is connected between the rotating plate and the base. The return member is configured for applying a return force to the movable end for the movable end to move toward an initial position, thereby cushioning a pivoting movement of the rotating plate and reducing vibrations of a control wire of the winding device during operation of the winding device.

7 Claims, 3 Drawing Sheets

CUSHIONING MECHANISM FOR CLAW MACHINE

BACKGROUND OF THE PRESENT INVENTION

Field of Invention

The present invention relates to a cushioning mechanism, and more particularly to a cushioning mechanism for a claw machine.

Description of Related Arts

A claw machine is an electronic game machine. In general, the claw machine includes a transparent box body in which prize items are displayed and a mechanical arm disposed at the top of the transparent box body for clawing the prize items in the transparent box body. The mechanical arm mainly includes a winding device and a claw device. The winding device is connected to the claw device via a control wire for controlling the movement and operation of the claw device.

However, due to the movement of the mechanical arm and the operation of the claw device, it is inevitable to generate vibrations, resulting in breakage of the control wire and deformation of the related structure. Accordingly, the inventor of the present invention has devoted himself based on his many years of practical experiences to solve these problems.

SUMMARY OF THE PRESENT INVENTION

In view of the problems of the prior art, the primary object of the present invention is to provide a cushioning mechanism for a claw machine. The cushioning mechanism is disposed in a winding device of a claw machine. The winding device has a base, a reel, a first pulley, a second pulley, a sleeve, and a control wire. The reel, the first pulley, the second pulley and the sleeve are all disposed on the base. The control wire is wound around the first pulley and the second pulley from the reel and passes through the sleeve, enabling the reel to control winding and unwinding of the control wire. The cushioning mechanism comprises a rotating plate and a return member. The rotating plate has a pivot end and a movable end. The pivot end is pivotally connected to the base in a manner that the movable end is movable relative to the pivot end. The first pulley is disposed on the movable end. The return member is connected between the rotating plate and the base. The return member is configured for applying a return force to the movable end for the movable end to move toward an initial position, thereby cushioning a pivoting movement of the rotating plate and reducing vibrations of the control wire during operation of the winding device.

In an embodiment of the present invention, the return member is an elastic member, and the return force is an elastic return force.

In an embodiment of the present invention, the return member is a tension spring configured to provide the elastic return force for pulling the movable end back to the initial position when the movable end is moved away from the initial position.

In an embodiment of the present invention, the cushioning mechanism further comprises a cushion block. The cushion block is disposed on the base corresponding to the movable end at an abutment position. When the movable end of the rotating plate is moved from the initial position to the abutment position, the cushion block leans against the rotating plate to provide a cushion to the rotating plate.

In an embodiment of the present invention, the cushioning mechanism further comprises a stretchable member. The cushion block is elastically connected to the base via the stretchable member. When the rotating plate leans against the cushion block, the cushion block and the rotating plate are cushioned by an elastic force applied by the stretchable member.

In an embodiment of the present invention, the stretchable member is a tension spring.

In an embodiment of the present invention, the cushioning mechanism further comprises a slide block and a guide rail. The slide block is disposed on the rotating plate to slide along with the rotating plate. The guide rail is disposed on the base corresponding in shape to a slide path of the slide block. The slide block slides on the guide rail to guide the pivoting movement of the rotating plate.

Through the technical solutions of the present invention, the cushioning mechanism of the claw machine provided by the present invention can apply a return force to the rotating plate through the return member, so that the first pulley disposed on the rotating plate provides an appropriate pulling force on the control wire for the vibration of the control wire to be suppressed, thereby effectively improving the problems of the control wire being prone to break and the related structure being prone to deform due to the vibration.

DETAILED DESCRIPTION OF THE PREFERRED EMBODIMENT

Embodiments of the present invention will now be described, by way of example only, with reference to the accompanying drawings.

Figure 1:
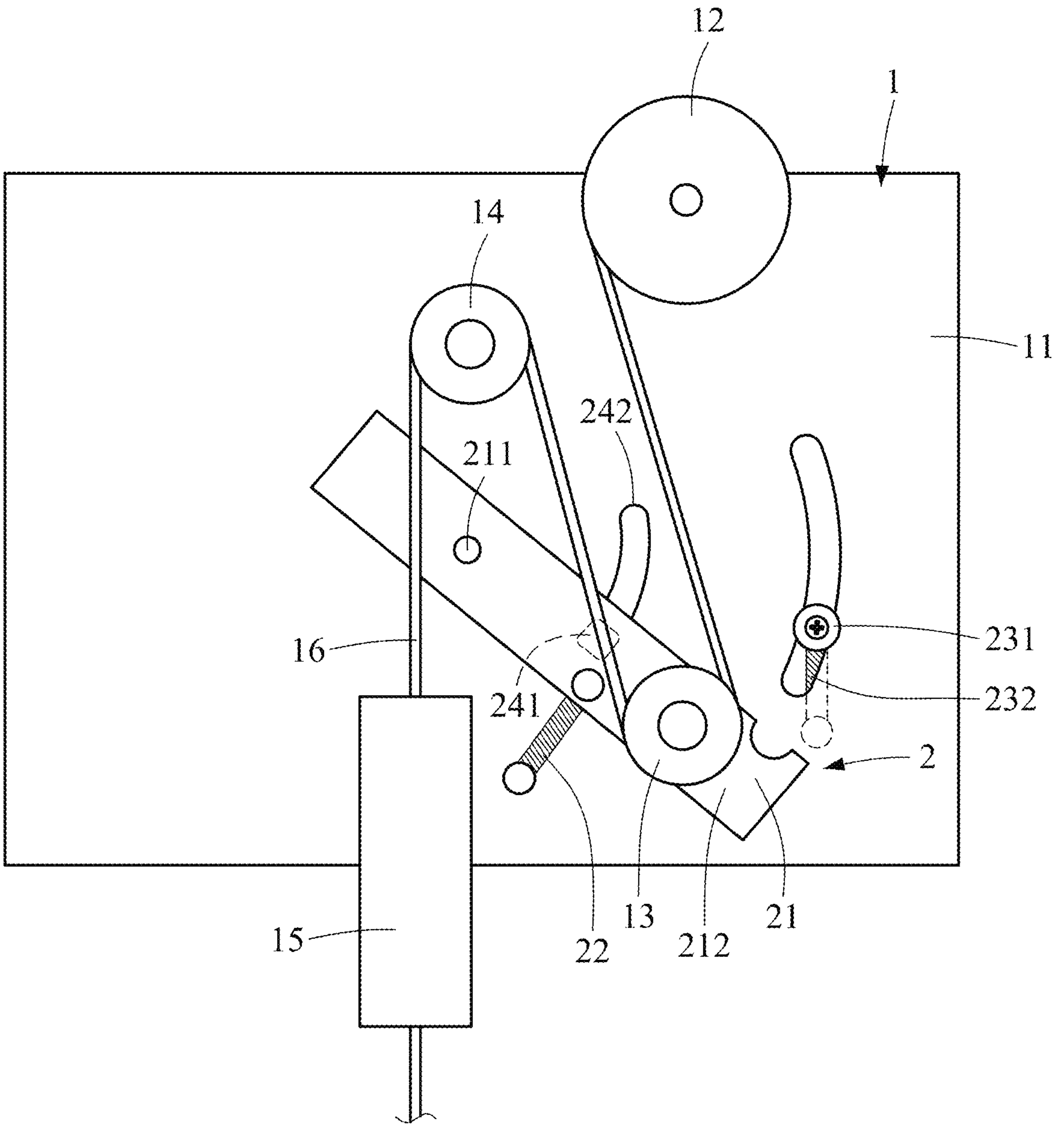
FIG. 1 is a schematic view of the cushioning mechanism of the claw machine according to a preferred embodiment of the present invention.
Figure 2:
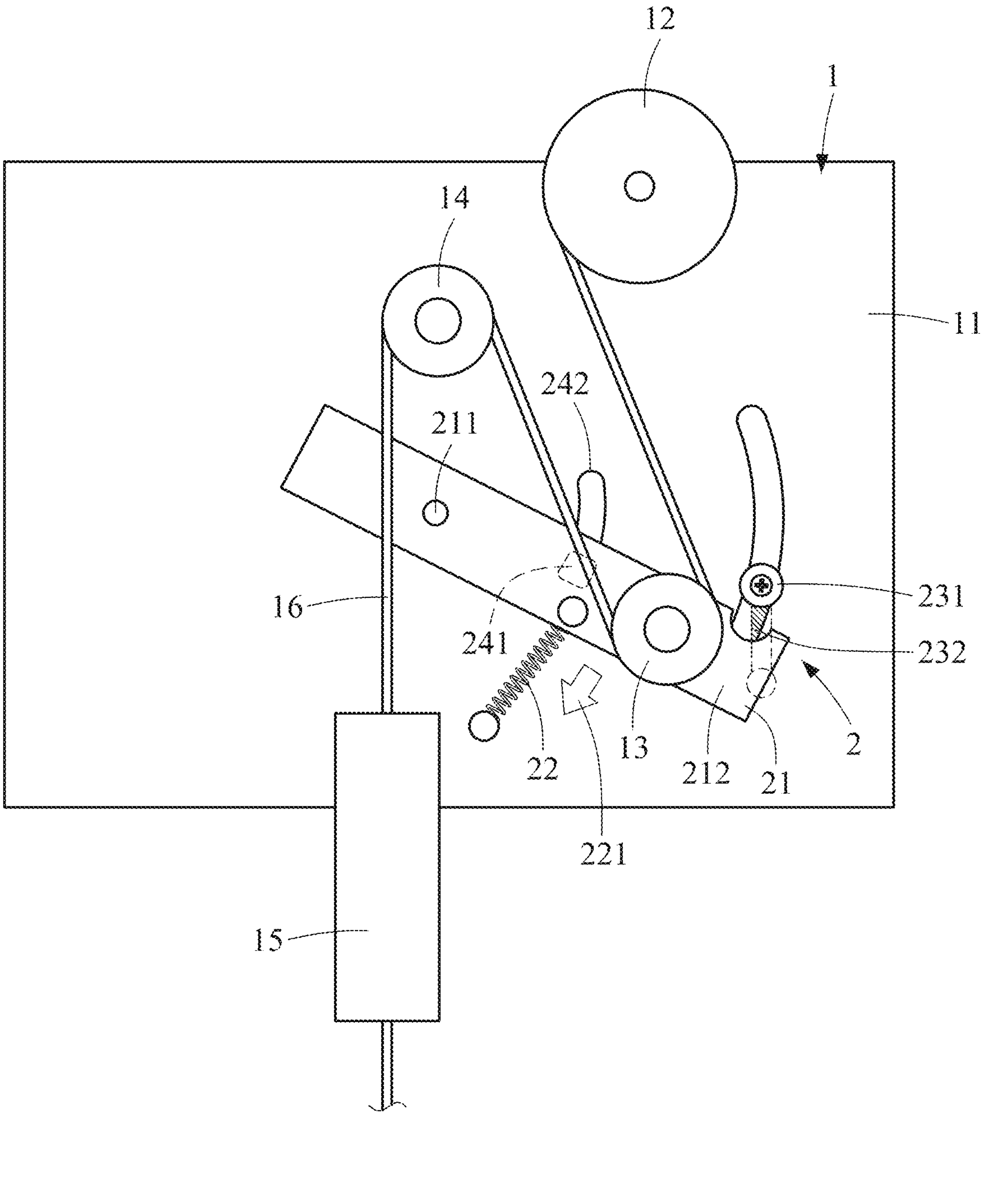
FIG. 2 is another schematic view of the cushioning mechanism of the claw machine according to the preferred embodiment of the present invention.
Figure 3:
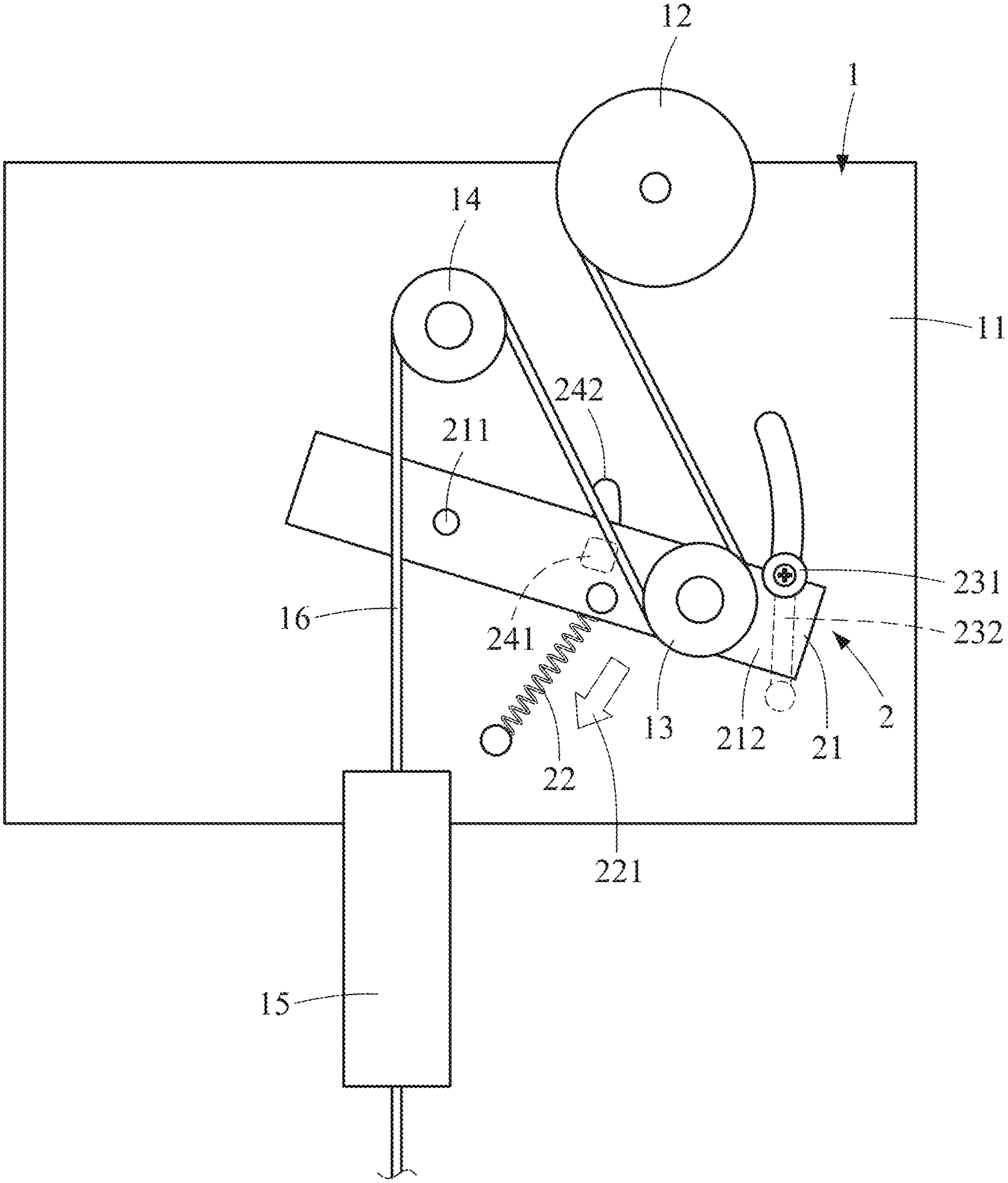
FIG. 3 is a further schematic view of the cushioning mechanism of the claw machine according to the preferred embodiment of the present invention.

Referring to FIG. 1 through FIG. 3, the present invention discloses a cushioning mechanism 2 for a claw machine. The cushioning mechanism 2 is disposed in a winding device 1 of a claw machine. The winding device 1 has a base 11, a reel 12, a first pulley 13, a second pulley 14, a sleeve 15, and a control wire 16. The reel 12, the first pulley 13, the second pulley 14 and the sleeve 15 are all disposed on the base 11. The control wire 16 is wound around the first pulley 13 and the second pulley 14 from the reel 12 and passes through the sleeve 15, enabling the reel 12 to control the winding and unwinding of the control wire 16.

As shown in FIG. 1 through FIG. 3, the cushioning mechanism 2 includes a rotating plate 21 and a return member 22.

As shown in FIG. 1 through FIG. 3, the rotating plate 21 has a pivot end 211 and a movable end 212. The pivot end 211 is pivotally connected to the base 11 in a manner that the movable end 212 is movable relative to the pivot end 211. The first pulley 13 is disposed on the movable end 212. Thus, the first pulley 13 can be moved along with the rotating plate 21, functioning as a movable pulley.

As shown in FIG. 1 through FIG. 3, the return member 22 is connected between the rotating plate 21 and the base 11. The return member 22 is configured for applying a return force 221 to the movable end 212 for the movable end 212 to move toward an initial position, thereby cushioning the pivoting movement of the rotating plate 21 and reducing the vibrations of the control wire 16 during operation of the winding device 1.

Through the above structure, the cushioning mechanism 2 of the claw machine provided by the present invention can apply a return force 221 on the rotating plate 21 through the return member 22, so that the first pulley 13 disposed on the rotating plate 21 provides an appropriate pulling force on the control wire 16 for the vibration of the control wire 16 to be suppressed, thereby effectively improving the problems of the control wire being prone to break and the related structure being prone to deform due to the vibration.

Preferably, as shown in FIG. 1 through FIG. 3, in an embodiment of the present invention, the return member 22 is an elastic member, and the return force 221 is an elastic return force. Further, the return member 22 is a tension spring configured to provide the elastic return force for pulling the movable end 212 back to the initial position when the movable end 212 is moved away from the initial position, but not limited thereto. In other embodiments, the return member 22 may be a compression spring or other types of elastic members.

Specifically, as shown in FIG. 2 and FIG. 3, when the winding device 1 controls the winding and unwinding of the control wire 16, the first pulley 13 will be displaced due to the pulling force of the control wire 16 and will move together with the rotating plate 21. When the movable end 212 of the rotating plate 21 is moved away from the initial position (as shown in FIG. 1), the return member 22 (tension spring) will be stretched accordingly. The return member 22 (tension spring) will provide the elastic return force to the object at its free end (i.e. the rotating plate 21) due to its own elastic deformation.

As shown in FIG. 2 and FIG. 3, according to Hooke's law, the farther the return member 22 (tension spring) is from the initial position (as shown in FIG. 1), the greater the elastic return force is. The elastic return force of the return member 22 (tension spring) can provide a moderate cushion for the pivoting movement of the rotating plate 21 and suppress the vibration generated during the movement, so that the control wire 16 is appropriately tightened, thereby simultaneously reducing the pivoting movement of the rotating plate 21 and the vibration of the control wire 16, so as to solve the problems of the control wire being prone to break and the related structure being prone to deform due to the vibration.

Preferably, as shown in FIG. 1 through FIG. 3, in an embodiment of the present invention, the cushioning mechanism 2 further includes a cushion block 231. The cushion block 231 is disposed on the base 11 corresponding to the movable end 212 at an abutment position (as shown in FIG. 3). When the movable end 212 of the rotating plate 21 is moved from the initial position (as shown in FIG. 1) to the abutment position (as shown in FIG. 3), the cushion block 231 leans against the rotating plate 21 to provide a cushion to the rotating plate 21.

Specifically, through the cushion block 231, when the movable end 212 of the rotating plate 21 is moved to the abutment position (as shown in FIG. 3), the cushion block 231 leans against the rotating plate 21 and provides a cushion for the pivoting movement of the rotating plate 21, reducing the vibration and improving the structural deformation caused by the vibration.

Preferably, as shown in FIG. 1 through FIG. 3, in an embodiment of the present invention, the cushioning mechanism 2 further includes a stretchable member 232. The cushion block 231 is elastically connected to the base 11 via the stretchable member 232. When the rotating plate 21 leans against the cushion block 231, the elastic force of the stretchable member 232 provides a cushion to the cushion block 231 and the rotating plate 21. Furthermore, the stretchable member 232 is a tension spring configured to be elongated when the rotating plate 21 leans against the cushion block 231 to provide a cushion through its elastic return force.

Preferably, as shown in FIG. 1 through FIG. 3, in an embodiment of the present invention, the cushioning mechanism 2 further includes a slide block 241 and a guide rail 242. The slide block 241 is disposed on the rotating plate 21 to slide along with the rotating plate 21. The guide rail 242 is disposed on the base 11 corresponding in shape to the slide path of the slide block 241. The slide block 241 slides on the guide rail 242 to guide the pivoting movement of the rotating plate 21.

Through the slide block 241 and the guide rail 242, the pivoting movement of the rotating plate 21 can be guided, so that the pivoting movement is smooth and the vibration is further reduced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A cushioning mechanism, disposed in a winding device of a claw machine, the winding device having a base, a reel, a first pulley, a second pulley, a sleeve and a control wire, the reel, the first pulley, the second pulley and the sleeve being disposed on the base, the control wire being wound around the first pulley and the second pulley from the reel and passing through the sleeve, enabling the reel to control winding and unwinding of the control wire, the cushioning mechanism comprising:

a rotating plate, having a pivot end and a movable end, the pivot end being pivotally connected to the base in a manner that the movable end is movable relative to the pivot end, the first pulley being disposed on the movable end; and a return member, connected between the rotating plate and the base, the return member being configured for applying a return force to the movable end for the movable end to move toward an initial position, thereby cushioning a pivoting movement of the rotating plate and reducing vibrations of the control wire during operation of the winding device.

2. The cushioning mechanism as claimed in claim 1, wherein the return member is an elastic member, and the return force is an elastic return force.

3. The cushioning mechanism as claimed in claim 2, wherein the return member is a tension spring configured to provide the elastic return force for pulling the movable end back to the initial position when the movable end is moved away from the initial position.

4. The cushioning mechanism as claimed in claim 1, further comprising a cushion block, wherein the cushion block is disposed on the base corresponding to the movable end at an abutment position, when the movable end of the rotating plate is moved from the initial position to the abutment position, the cushion block leans against the rotating plate to provide a cushion to the rotating plate.

5. The cushioning mechanism as claimed in claim 4, further comprising a stretchable member, wherein the cushion block is elastically connected to the base via the stretchable member, when the rotating plate leans against the cushion block, the cushion block and the rotating plate are cushioned by an elastic force applied by the stretchable member.

6. The cushioning mechanism as claimed in claim 5, wherein the stretchable member is a tension spring.

7. The cushioning mechanism as claimed in claim 1, further comprising a slide block and a guide rail, wherein the slide block is disposed on the rotating plate to slide along with the rotating plate, the guide rail is disposed on the base corresponding in shape to a slide path of the slide block, and the slide block slides on the guide rail to guide the pivoting movement of the rotating plate.

* * * * *